No. 749,866. PATENTED JAN. 19, 1904.
H. B. KING & H. M. QUICK.
VEHICLE MUD GUARD.
APPLICATION FILED SEPT. 22, 1903.
NO MODEL.

WITNESSES:

INVENTORS.
Henry B. King and
Hiram M. Quick
BY
ATTORNEYS

No. 749,866. Patented January 19, 1904.

UNITED STATES PATENT OFFICE.

HENRY B. KING AND HIRAM M. QUICK, OF PATERSON, NEW JERSEY.

VEHICLE MUD-GUARD.

SPECIFICATION forming part of Letters Patent No. 749,866, dated January 19, 1904.

Application filed September 22, 1903. Serial No. 174,233. (No model.)

*To all whom it may concern:*

Be it known that we, HENRY B. KING and HIRAM M. QUICK, citizens of the United States, residing at Paterson, in the county of Passaic and State of New Jersey, have invented certain new and useful Improvements in Vehicle Mud-Guards, of which the following is a specification, reference being had therein to the accompanying drawings.

Our invention relates to improvements in mud-guards for vehicles, and is particularly well adapted for automobiles.

The objects of our improvement are, first, to provide a combined step and mud-guard for the front and rear wheels of a vehicle; second, to produce a mud-guard that will be both ornamental and durable, and, third, to provide a mud-guard for vehicles that will reduce to some extent the damage done in cases of accident by doing away with the sharp edges and corners of the wheel-fenders or mud-guards now in vogue. We attain these objects by the mud-guards and steps illustrated in the accompanying drawings, in which—

Figure 1:
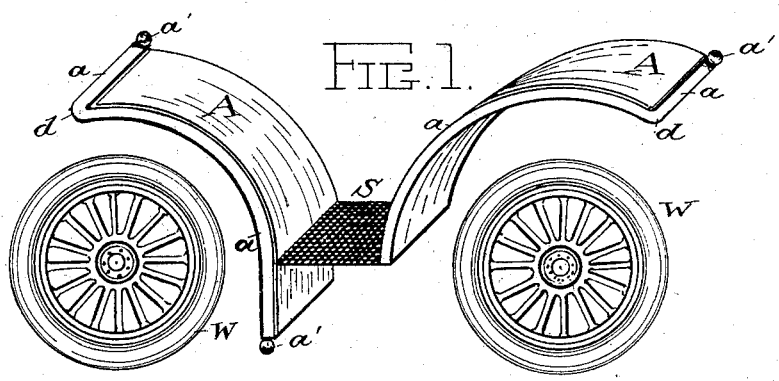
Figure 2:
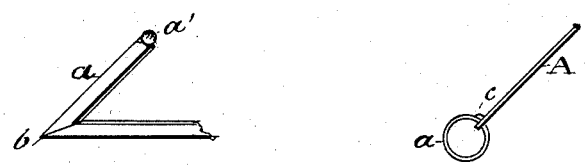
Figure 3:
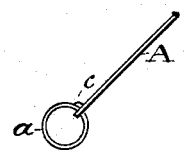

Figure 1 is a side view of portions of a vehicle, showing mud-guards embodying our invention. Fig. 2 is a cross-sectional view through the mud-guard, showing the main body of the guard, the round tubular border or edge, and the beading-strip around the body inside the tubular edge secured thereto; and Fig. 3 is a detailed view of a modification of the round border, the corners being mitered instead of being bent or curved.

Similar letters refer to similar parts throughout the several views.

The body A of the fender may consist of any metal or other material with or without a covering. The outside edges of the body A are inserted in a slot in the border or edge *a* and are secured therein by brazing or in any other suitable manner. We prefer to make the round border *a* of brass or other tubing and to bend or curve it, as shown at *d*, thus obviating the sharp edges and corners usually embodied in wheel-fenders or mud-guards; but it may be solid. The beading-strip *c* is suitably secured at the juncture of the body A and the border *a* to keep the joint free from accumulations of dirt, to add to the appearance of the guard, and to permit the polishing of the border without wear and tear to the body portion A. The step S is secured to the front and rear mud-guards in any suitable manner. Ornamental knobs *a'* are secured to the extremities of the tubular border.

Our improved mud-guard may be made to conform to the shape or structure of any vehicle without departing from the spirit or scope of our invention, as the tubular border is capable of being bent or curved as desired.

The tubular border gives to the mud-guards strength and durability and is also ornamental to a high degree. The combined step and mud-guard afford complete protection against the mud flying from the wheels W.

It is not deemed necessary to show a complete vehicle nor to show the means for supporting the step and mud-guard, as they may be supported in any suitable manner from the vehicle-frame.

With this description of our invention, what we claim, and desire to secure by Letters Patent, is—

1. As a new article of manufacture, a mud-guard consisting of the main body portion in combination with a round border provided with a slot to receive and hold the outer edges of said body portion, substantially as set forth.

2. In a vehicle mud-guard, the main body portion in combination with a tubular metallic border provided with a slot into which the edges of the body portion enter and are secured, substantially as set forth.

3. In a vehicle, a step, rigidly secured to and in combination with mud-guards having a tubular metallic border, substantially as set forth.

4. In a vehicle mud-guard, the body portion having the exposed or outer corners rounded in combination with a tubular metallic border provided with a slot adapted to receive the outer edges of the body portion, and a beading-strip connecting the body portion and the tubular border, substantially as set forth.

5. In a vehicle mud-guard the body portion having the exposed or outer corners rounded, in combination with a tubular metallic border provided with a slot adapted to receive the outer edges of said body portion, means for securing the body portion to said border, and ornamental knobs secured to the extremities of said border, substantially as set forth.

In testimony whereof we affix our signatures in presence of two witnesses.

HENRY B. KING.
HIRAM M. QUICK.

Witnesses:
MINNIE L. DILL,
JOHN F. KERR.